(12) United States Patent
Jung et al.

(10) Patent No.: US 8,743,754 B2
(45) Date of Patent: Jun. 3, 2014

(54) TRANSMITTER HAVING MULTIPLE ANTENNAS

(75) Inventors: Man Young Jung, Anyang-si (KR); Su Hwan Lim, Anyang-si (KR); Yoon Oh Yang, Anyang-si (KR); Sang Wook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 13/521,954

(22) PCT Filed: Dec. 22, 2010

(86) PCT No.: PCT/KR2010/009211
§ 371 (c)(1),
(2), (4) Date: Jul. 12, 2012

(87) PCT Pub. No.: WO2011/126203
PCT Pub. Date: Oct. 13, 2011

(65) Prior Publication Data
US 2012/0287887 A1    Nov. 15, 2012

Related U.S. Application Data

(60) Provisional application No. 61/321,083, filed on Apr. 5, 2010.

(30) Foreign Application Priority Data

Sep. 3, 2010  (KR) ........................ 10-2010-0086352

(51) Int. Cl.
*H04B 7/00* (2006.01)
(52) U.S. Cl.
USPC .......................................... 370/310; 370/343
(58) Field of Classification Search
USPC ......... 370/310, 328–330, 335–337, 342–345, 370/347; 445/422.1, 445, 446, 450
See application file for complete search history.

(56) References Cited

U.S. PATENT DOCUMENTS

| | | |
|---|---|---|
| 2006/0209667 A1 | 9/2006 | Li |
| 2006/0270343 A1 | 11/2006 | Cha et al. |
| 2007/0021080 A1* | 1/2007 | Kuriyama et al. ............ 455/132 |
| 2007/0224943 A1 | 9/2007 | Gu et al. |
| 2008/0014892 A1 | 1/2008 | Aldana |
| 2012/0224617 A1* | 9/2012 | Feher ............................ 375/222 |
| 2012/0281741 A1* | 11/2012 | Feher ............................ 375/219 |

* cited by examiner

*Primary Examiner* — Kerri Rose
(74) *Attorney, Agent, or Firm* — Birch, Stewart, Kolasch & Birch, LLP

(57) ABSTRACT

The present invention is directed to a wireless communication system, more specifically, a transmitter used for wireless communication and a method for the same. The transmitter used for wireless communication comprises a plurality of transmitting antennas; a plurality of radio frequency (RF) chains configured for each of the transmitting antennas; a signal generator generating one or more transmitting signals at a base band; and an RF switch mapping the one or more transmitting signals into the plurality of RF chains.

10 Claims, 19 Drawing Sheets

(a) $P_{TX} < P_{TH\_II}$ (a) $P_{TX} < P_{TH\_II}$ (b) $P_{TX} < P_{TH\_l2}$ (c) $P_{TX} < P_{TH\_i3}$ (d) $P_{TX} > P_{TH\_l3}$ (a) $P_{TX} < P_{TH\_2l}$ (b) $P_{TX} < P_{TH\_22}$ (a) $P_{TX} < P_{TH\_3l}$ (b) $P_{TX} > P_{TH\_31}$

TRANSMITTER HAVING MULTIPLE ANTENNAS

CROSS REFERENCE TO RELATED APPLICATIONS

This application is the National Phase of PCT/KR2010/009211 filed on Dec. 22, 2010, which claims priority under 35 U.S.C. §119(e) to U.S. Provisional Application No. 61/321,083 filed on Apr. 5, 2010 and under 35 U.S.C. §119(a) to Patent Application No. 10-2010-0086352 filed in the Republic of Korea on Sep. 3, 2010, all of which are hereby expressly incorporated by reference into the present application.

TECHNICAL FIELD

The present invention relates to a wireless communication system, and more particularly, to a transmitter having multiple antennas, especially an architecture of a transmitter and a method for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DESCRIPTION OF THE INVENTION

Technical Problems

Accordingly, the present invention is directed to a transmitter and a method for the same, which substantially obviate one or more problems due to limitations and disadvantages of the related art.

An object of the present invention is to provide a transmitter that can use a power in a multiple input multiple output (MIMO) system and a method for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

To achieve these objects and other advantages and in accordance with the purpose of the invention, as embodied and broadly described herein, in one aspect of the present invention, a transmitter used for wireless communication comprises a plurality of transmitting antennas; a plurality of radio frequency (RF) chains configured for each of the transmitting antennas; a signal generator generating one or more transmitting signals at a base band; and an RF switch mapping the one or more transmitting signals into the plurality of RF chains.

In this case, each of the RF chains includes a mixer for frequency conversion and a power amplifier (PA) connected with the mixer, and the RF switch is located between the mixer and the power amplifier.

Each of the RF chains includes a mixer for frequency conversion and a power amplifier (PA) connected with the mixer, and the RF switch is located before the mixer.

The RF switch maps at least a part of the one or more transmitting signals into the plurality of RF chains in a one-to-multi mapping mode.

The RF switch changes the number of RF chains mapped into the one or more transmitting signals, based on a transmission power used for the one or more transmitting signals.

The RF switch performs mapping between the one or more transmitting signals and the plurality of RF chains independently for each of the transmitting signals.

The RF switch changes a mapping pattern between the one or more transmitting signals and the plurality of RF chains depending on time.

In another aspect of the present invention, a method for transmitting signals at a transmitter in a wireless communication system, which supports multiple input multiple output (MIMO), comprises the steps of generating one or more base band signals; converting the one or more base band signals into one or more band pass signals through a plurality of RF chains configured for each of transmitting antennas; and transmitting the one or more band pass signals to a receiver, wherein the step of converting the one or more base band signals includes mapping the one or more base band signals into the plurality of RF chains.

The step of converting the one or more base band signals includes frequency-uplink-converting the one or more base band signals; and amplifying a power of the frequency-uplink-converted signal, wherein the step of mapping the one or more base band signals is performed between the frequency-uplink-converting step and the amplifying step.

The step of converting the one or more base band signals includes frequency-uplink-converting the one or more base band signals; and amplifying a power of the frequency-uplink-converted signal, wherein the step of mapping the one or more base band signals is performed prior to the frequency-uplink-converting step.

At least a part of the one or more transmitting signals is mapped into the plurality of RF chains in a one-to-multi mapping mode.

The number of RF chains mapped into the one or more transmitting signals is changed based on a transmission power used for the one or more transmitting signals.

Mapping between the one or more base band signals and the plurality of RF chains is performed independently for each of the base band signals.

A mapping pattern between the one or more base band signals and the plurality of RF chains is changed depending on time.

Advantageous Effects

According to the embodiments of the present invention, a power can be used efficiently in a multiple input multiple output (MIMO) system. Also, the maximum transmission power of the transmitter can be increased, and transmitting signal quality can be improved. Moreover, as the consumed power is reduced, the time used for the transmitter can be increased.

It is to be understood that the advantages that can be obtained by the present invention are not limited to the aforementioned advantage and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

In this specification, transmission power can be expressed as a linear scale or dB scale. Also, the operation according to the embodiment of the present invention can be performed in a power domain or an amplitude domain.

First of all, a network architecture of an Evolved Universal Mobile Telecommunications System (E-UMTS) will be described. The E-UMTS may be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Figure 1:
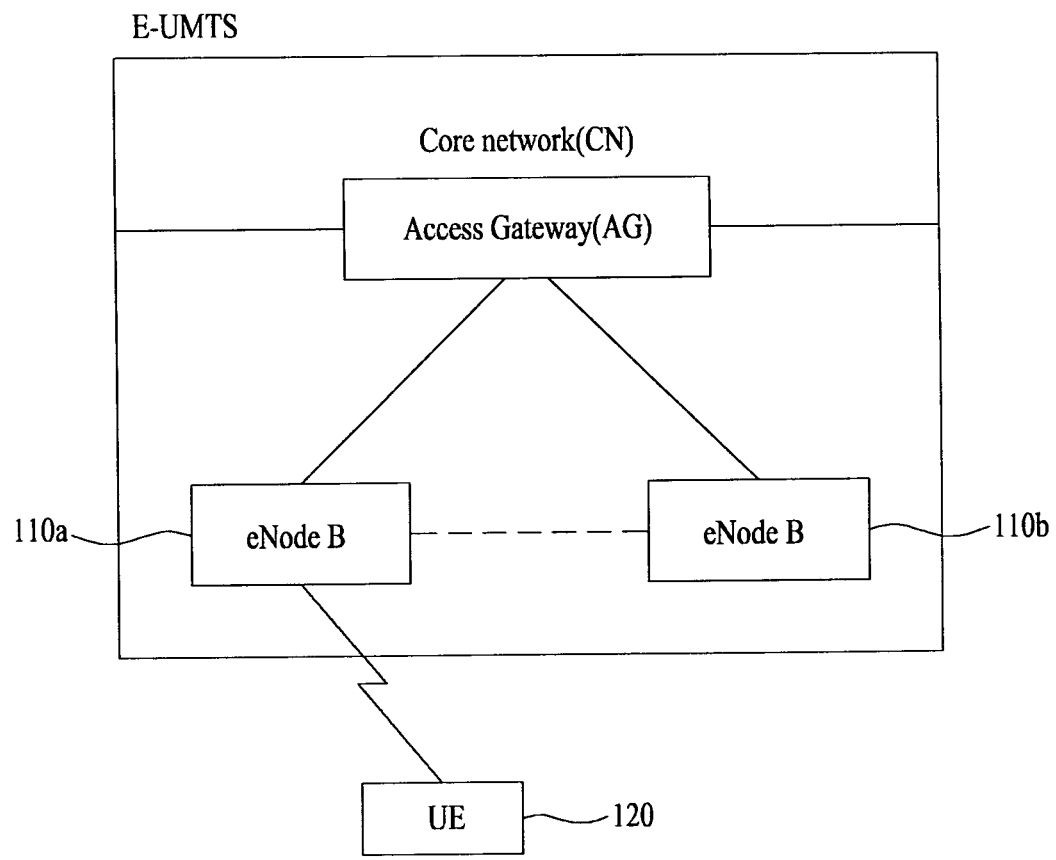
FIG. 1 is a diagram illustrating a network architecture of an Evolved Universal Mobile Telecommunications System (E-UMTS)

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz. Different cells may be set to provide different bandwidths. Also, one base station controls data transmission and reception for a plurality of user equipments. The base station transmits downlink (DL) scheduling information of downlink data to a corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. A Core Network (CN) may include the AG and a network node for user registration of the UE. The AG manages mobility of a UE on a Tracking Area (TA) basis, wherein one TA includes a plurality of cells.

Figure 2:
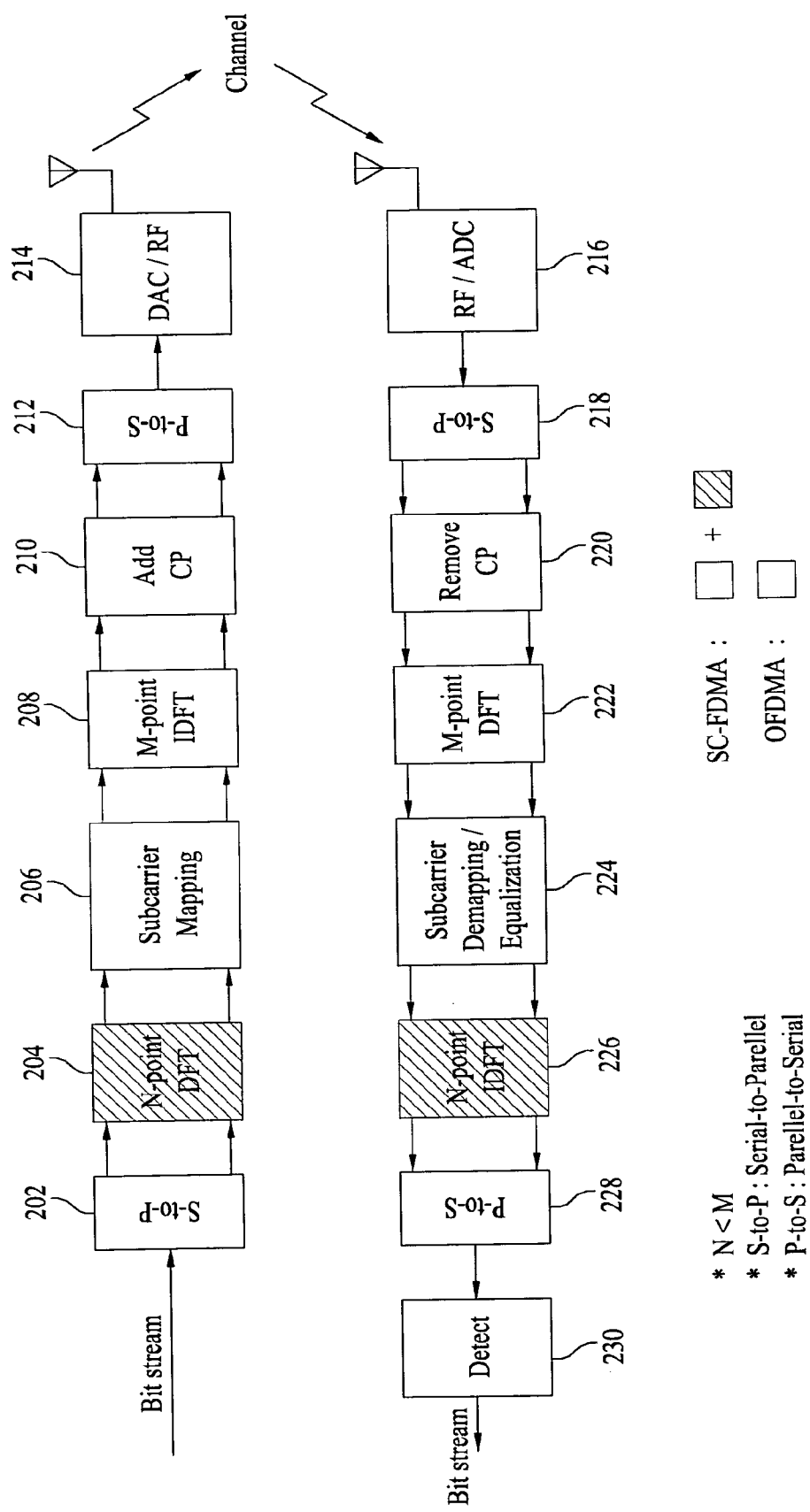
FIG. 2 is a block diagram illustrating a transmitter and a receiver for OFDMA and SC-FDMA.

FIG. 2 is a block diagram illustrating a transmitter and a receiver for OFDMA and SC-FDMA. In an uplink, transmitters 302 to 314 are parts of the user equipment, and receivers 316 to 330 are parts of the base station. In a downlink, the transmitters are parts of the base station, and the receivers are parts of the user equipment.

Referring to FIG. 2, an OFDMA transmitter includes a serial to parallel converter 202, a sub-carrier mapping module 206, an M-point inverse discrete fourier transform (IDFT) module 208, a cyclic prefix (CP) addition module 210, a parallel to serial converter 212, and a radio frequency (RF)/digital to analog converter (DAC) module 214.

A signal processing procedure in the OFDMA transmitter will be described below. First of all, bit streams are modulated to data symbol sequences. The bit streams correspond to codewords or transport blocks. The data symbol sequences in series are converted to parallel data symbol sequences as much as N (202). N number of data symbols are mapped with N number of subcarriers allocated among a total of M number of subcarriers, and the other M-N number of carriers are padded with 0 (206). The data symbols mapped in a frequency domain are converted to time domain sequences through M-point IDFT processing (208). Afterwards, in order to reduce inter-symbol interference (ISI) and inter-carrier interference (ICI), cyclic prefix is added to the time domain sequences to generate OFDMA symbols (210). The generated OFDMA symbols are converted from parallel symbols to serial symbols (212). Then, the OFDMA symbols are transmitted to the receiver through digital-to-analog conversion and frequency uplink conversion (214). On the other hand, the OFDMA receiver includes an RF/ADC (analog to digital converter) module 216, a serial-to-parallel converter 218, a cyclic prefix (CP) removing module 220, an M-point discrete fourier transform (DFT) module 222, a subcarrier demapping/equalization module 224, a parallel-to-digital converter 228, and a detection module 230. A signal processing procedure of the OFDMA receiver will be configured in reverse order of the OFDMA transmitter.

As compared with the OFDMA transmitter, the SC-FDMA transmitter additionally includes an N-point DFT module 204 prior to the subcarrier mapping module 206. The SC-FDMA transmitter can reduce a peak-to-average power ratio (PAPR) of a transmitting signal more remarkably than the OFDMA transmitter by spreading a plurality of data to the frequency domain through DFT prior to IDFT processing. Also, as compared with the OFDMA receiver, the SC-FDMA receiver additionally includes an N-point IDFT module 226 after the subcarrier demapping module 224. A signal processing procedure of the SC-FDMA receiver will be configured in reverse order of the SC-FDMA transmitter.

Figure 3:
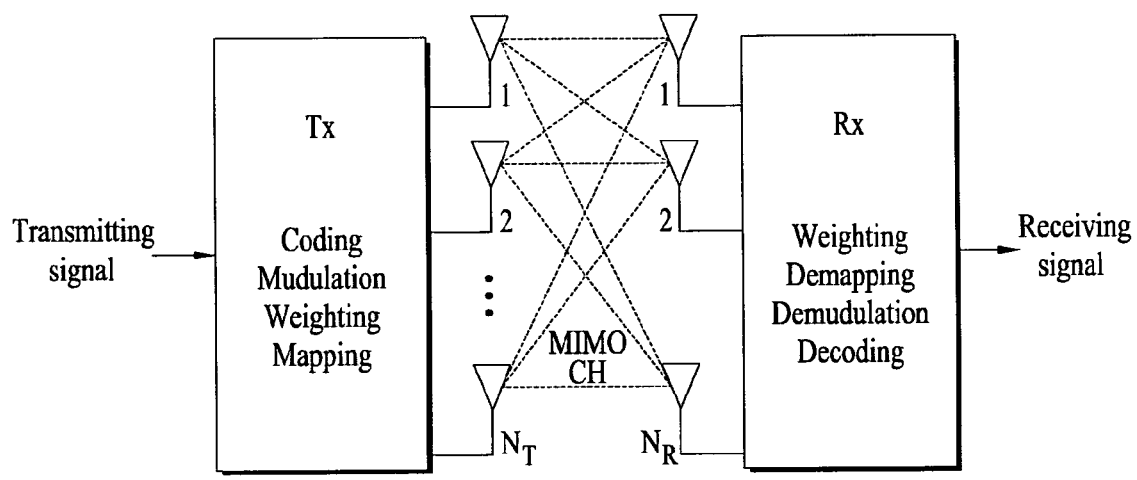
FIG. 3 is a diagram illustrating a multiple input multiple output (MIMO) communication system.

FIG. 3 is a diagram illustrating a multiple input multiple output (MIMO) communication system. The MIMO technology means a technology that performs communication by using multiple transmitting antennas and/or multiple receiving antennas. The MIMO technology can remarkably improve communication capacity and transmission and reception performance without additional frequency allocation or power increase. Examples of the MIMO scheme include a spatial diversity scheme and a spatial multiplexing scheme, wherein the spatial diversity scheme is to enhance transmission reliability using symbols which have passed through various channel paths, and the spatial multiplexing scheme is to increase a transmission rate by simultaneously transmitting a plurality of data symbols using a plurality of transmitting antennas. Many studies on a hybrid scheme of the above two schemes have been recently made to appropriately obtain advantages of the above two schemes. Hereinafter, each of the schemes will be described in more detail.

First, the spatial diversity scheme includes a space time block code system and a space time trellis code system, wherein the space time trellis code system uses diversity gain and coding gain at the same time. Generally, although the trellis code system is excellent in performance of bit error rate and degrees of freedom for code generation, the space time block code system is better in view of computation complexity. The spatial diversity gain can obtain a value corresponding to the product of the number of transmitting antennas and the number of receiving antennas.

Second, spatial multiplexing scheme transmits different data streams through respective transmitting antennas. At this time, mutual interference occurs between the data simultaneously transmitted from the transmitter, the receiver removes mutual interference by using a proper signal processing scheme and then performs signal detection. Examples of the scheme for removing the interference include maximum likelihood (ML) scheme, a zero forcing (ZF) scheme, a minimum mean square error (MMSE) scheme, a diagonal bell laboratories layered space-time (D-BLAST) scheme, and a vertical bell labs layered space-time (V-BLAST) scheme. If the transmitter knows channel information, a singular value decomposition (SVD) scheme can be used.

Third, the hybrid scheme of spatial diversity and spatial multiplexing can be used. If spatial diversity gain is only obtained, performance improvement gain based on increase of the diversity order gradually reaches a saturation state. On the other hand, if spatial multiplexing gain is only obtained, transmission reliability in a radio channel is deteriorated. The hybrid scheme includes a double-space time transmit diversity (D-STTD) scheme and a space time bit-interleaved coded modulation (STBICM) scheme.

Equation 1 expresses a matrix of a MIMO channel between $N_T$ number of transmitting antennas and $N_R$ number of receiving antennas.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 1]}$$

In this case, $h_{ij}$ represents channels from a transmitting antenna j to a receiving antenna i. Additive white Gaussian noise (AWGN) is actually added to the channels after going through a channel matrix H. AWGN $n_1, n_2, \ldots, n_{N_R}$ added to each of the $N_R$ receiving antennas can be expressed as follows.

Equation 2 expresses signals received through the MIMO channels.

$$y = \begin{bmatrix} y_1 \\ y_2 \\ \vdots \\ y_i \\ \vdots \\ y_{N_R} \end{bmatrix} \quad \text{[Equation 2]}$$

$$= \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n = HWPs + n = \tilde{H}s + n$$

In this case, $y = [y_1, y_2, \ldots, y_{N_R}]^T$ represents signals received through the respective receiving antennas, and $x_1, x_2, \ldots, x_{N_T}$ represents signals transmitted through the respective transmitting antennas. Precoding (for example, application of weight value) can be applied to $x_1, x_2, \ldots, x_{N_T}$ so as to facilitate MIMO signal processing.

In the mean time, a rank of the matrix is defined by a minimum number of columns or rows independent from one another. A rank (H) of the channel matrix is limited as expressed by Equation 3 below.

$$\text{rank}(H) \leq \min(N_T, N_R) \qquad \text{[Equation 3]}$$

The rank may be defined by the number of eigen values not 0 when eigen value decomposition is performed for the matrix. Similarly, the rank may be defined by the number of singular values not 0 when singular value decomposition is performed for the matrix. Accordingly, in the channel matrix, the rank may physically mean a maximum number of columns or rows that can transmit different kinds of information from a given channel. In a wireless communication system, the rank may be used as the same value as the number of different kinds of information (for example, layers and streams) simultaneously transmitted from the transmitter. The rank value may be used to refer to the number of the MIMO channels.

Figure 4:
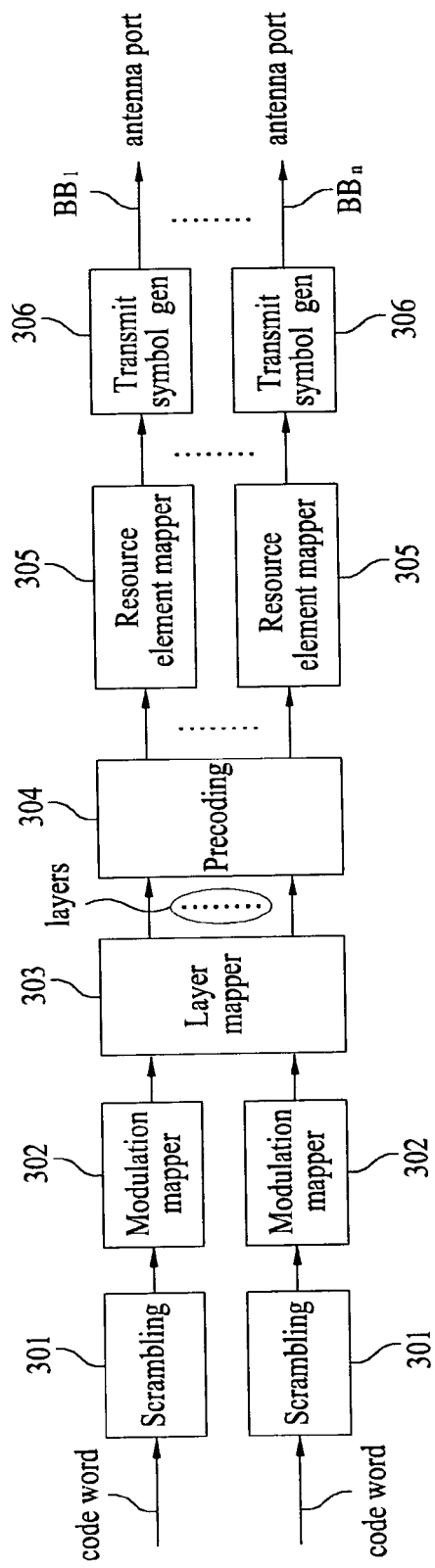
FIG. 4 is a diagram illustrating a structure of a transmitter that supports multiple antennas.

FIG. 4 is a diagram illustrating a structure of a transmitter that supports multiple antennas. In more detail, FIG. 4 illustrates a signal generator for generating a transmitting signal at a base band.

Referring to FIG. 4, a scrambling module 301 scrambles one or more codewords by using cell-specific scrambling codes or user equipment-specific scrambling codes. The codewords are a coded version of a transport block received from an upper layer (for example, medium access control (MAC) layer). A modulation mapper 302 modulates the scrambled codeword signals into complex symbols by using various modulation schemes (for example, BPSK, QPSK, 16 QAM or 64 QAM) depending on types of transmitting signals and/or the channel status. A layer mapper 303 maps the modulated complex symbols into one or more layers. The number of layers may be the same as the rank value (or the number of MIMO channels). One codeword can be mapped into one or more layers depending on the rank value. A precoding module 304 multiplies the layer mapped signal and a precoding matrix to allocate the layer mapped signal to each transmitting antenna. A resource element mapper 305 maps the transmitting signals split per transmitting antenna (port) into time-frequency resource elements. A transmitting signal generator 306 generates OFDM symbols or SC-FDMA symbols. The signals to reach the transmitting signal generator 306 correspond to base band (BB) signals. The base band signals generated for each of antennas (ports) are converted into pass band signals through a radio frequency (RF) unit and then transmitted.

Figure 5:
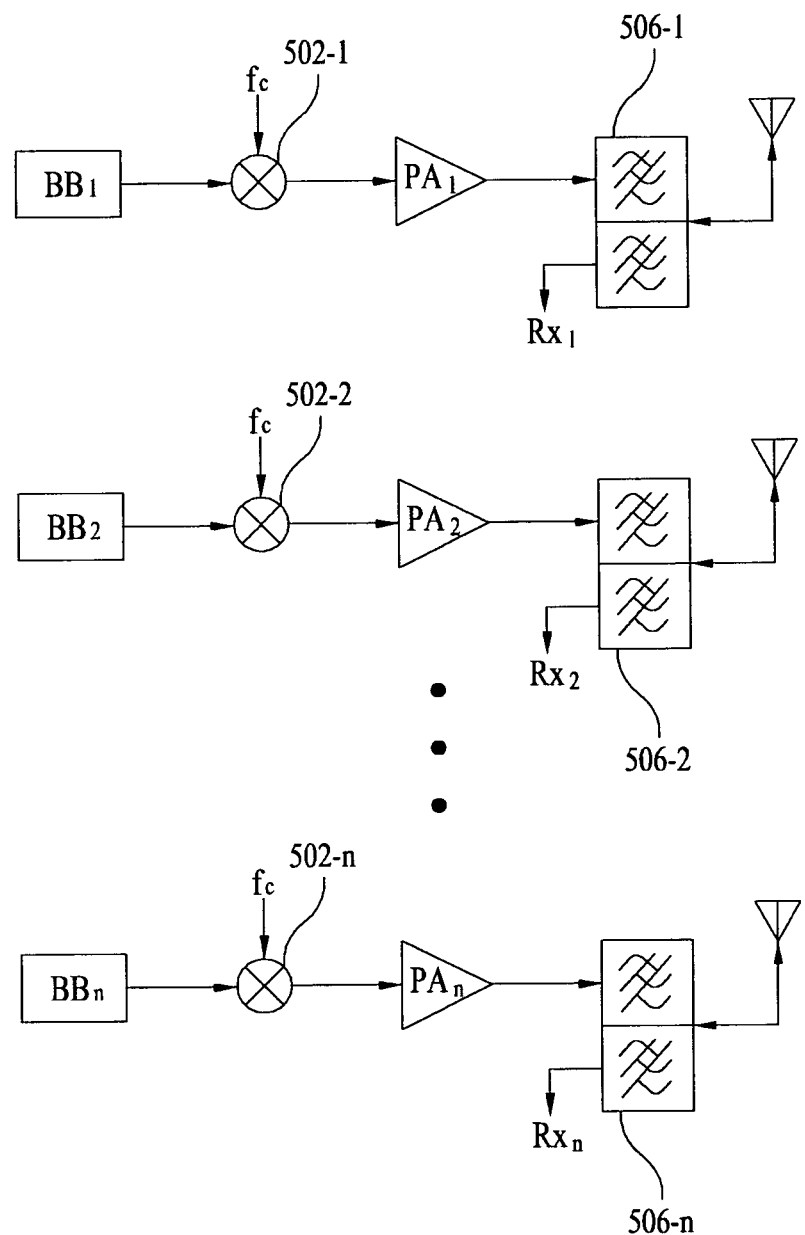
FIG. 5 is a diagram illustrating an RF unit of a transmitter according to the related art.

FIG. 5 is a diagram illustrating an RF unit of a transmitter according to the related art.

Referring to FIG. 5, a MIMO RF unit according to the related art includes a plurality of RF chains configured for each of antennas. Each of the RF chains includes mixers 502-1 to 502-$n$ for frequency conversion, power amplifiers (PA) $PA_1$ to $PA_n$, and duplexers (or filters) 506-1 to 506-$n$. The respective RF chains are configured in parallel and operated independently. The base band signals $BB_1$ to $BB_n$ generated for each of antennas (ports) are input to the mixers 502-1 to 502-$n$. The mixers 502-1 to 502-$n$ uplink-convert the center frequency of the base band signals $BB_1$ to $BB_n$ into carrier $f_c$ by multiplying the base band signals $BB_1$ to $BB_n$ by $f_c$. The power amplifiers $PA_1$ to $PA_n$ amplify the power of frequency uplink-converted signals within the range of a maximum transmission power. The duplexers (or filters) 506-1 to 506-$n$ filter the amplified signals in accordance with the given transmission bandwidth and then generate band pass signals. Each of the antennas transmits the band pass signals to the receiver through a radio interface.

Even if the RF unit according to the related art does not support MIMO, the PA of the corresponding RF chain is used in accordance with the maximum transmission power suggested in the specifications to support the same maximum transmission power. For example, it is supposed that the maximum transmission power of 23 dBm is given and one antenna is used depending on the channel status. In this case, three RF chains are not used but one RF chain is used, and the PA of the corresponding RF chain transmits the output of maximum 23 dBm in accordance with the maximum transmission power.

Figure 6:
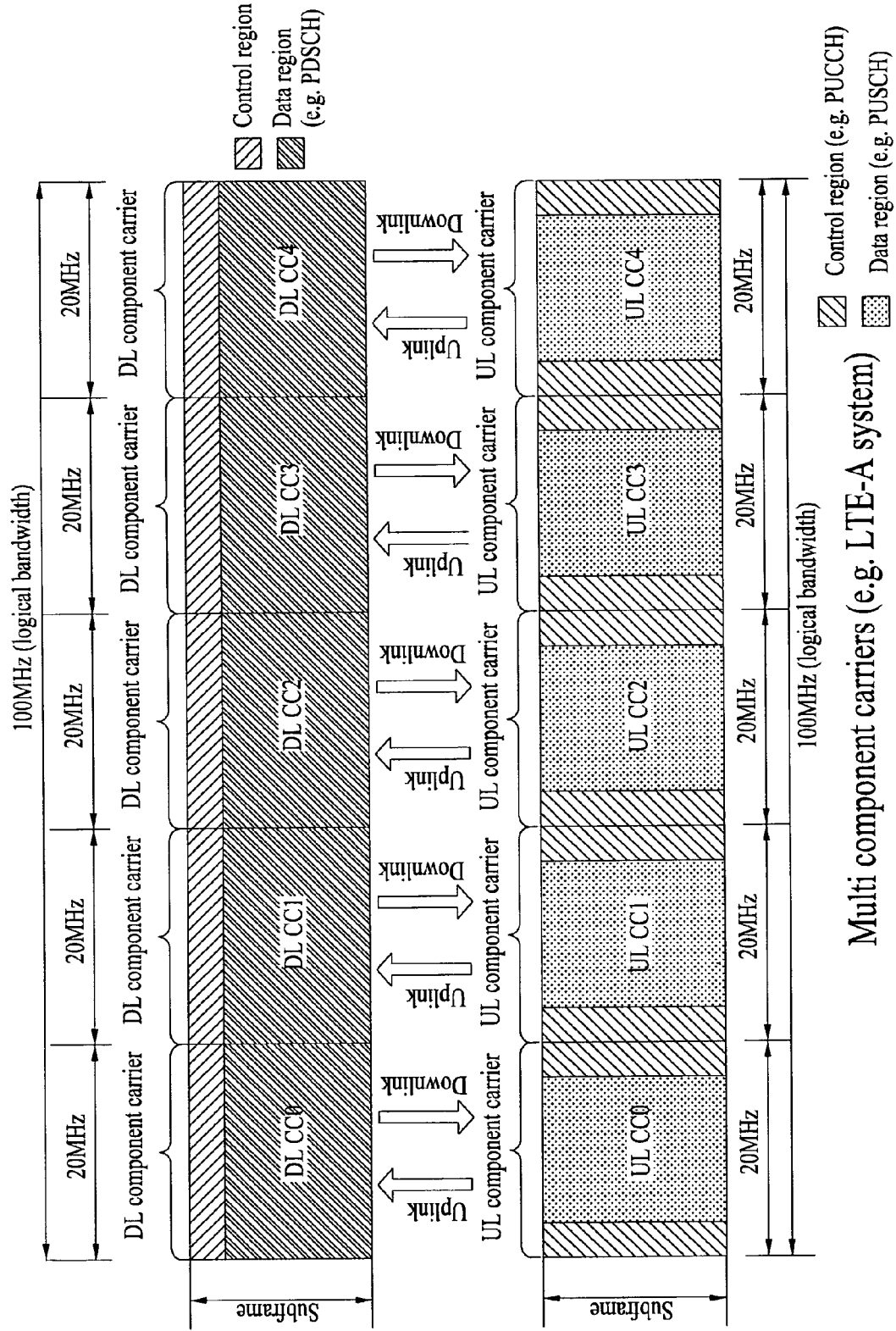
FIG. 6 is a diagram illustrating an example of communication performed using multiple component carriers (CC) under the carrier aggregation (CA) status.

FIG. 6 is a diagram illustrating an example of communication performed using multiple component carriers (CCs) under the carrier aggregation (CA) status. FIG. 6 corresponds to a communication example in the LTE-A system. The LTE-A system uses carrier aggregation or bandwidth aggregation where a plurality of uplink/downlink frequency blocks are collected to use broader frequency bandwidths, thereby using greater uplink/downlink bandwidths. Each frequency block is transmitted using a component carrier (CC). The CC may mean a frequency block for carrier aggregation or a center carrier of a frequency block depending on the context, wherein the frequency block and the center carrier are used together.

Referring to FIG. 6, five component carriers (CCs) of 20 MHz are collected in the uplink/downlink to support a bandwidth of 100 MHz. The respective CCs may adjoin each other in the frequency domain or not. For convenience, FIG. 6 illustrates that a bandwidth of each UL CC is the same as and symmetrical to that of each DL CC. However, the bandwidths of the respective component carriers may be defined independently. Also, asymmetrical carrier aggregation where the number of uplink component carriers is different from the number of downlink component carriers may be configured. The asymmetrical carrier aggregation may occur due to a limit of available frequency bandwidth, or may be configured artificially by network configuration. Also, although an uplink signal and a downlink signal are transmitted through CCs mapped with each other one to one, CC through which a signal is actually transmitted may be changed depending on network configuration or signal type. For example, CC through which a scheduling command is transmitted may be different from CC through which data are transmitted in accordance with a scheduling command. Also, uplink/downlink control information can be transmitted through a specific UL/DL CC regardless of mapping between CCs. In the mean time, even though N number of CCs are configured in the entire system band, a frequency band that can be received by a specific user equipment can be limited to M(<N) number of CCs.

In the LTE-A of which standardization is being actively discussed, the maximum transmission power of a user equipment that supports MIMO is defined based on antennas, and is defined at 23 dBm regardless of the number of active antennas. The maximum transmission power is mainly limited by the power amplifier PA. Generally, non-linearity of the power amplifier PA increases rapidly beyond an allowable output range of the power amplifier PA. Non-linearity of the power amplifier PA causes inter-modulation between input signals, and as a result, a plurality of out-of-band signals are generated. Since the out-of-band signals may cause great interference with another neighboring system, most of specifications including the LTE apply a strict spectrum emission (SM) basis to prevent such interference from occurring.

Interference caused by inter-modulation is increased as the transmission power is increased. Interference caused by inter-modulation is rapidly increased as a peak to average power ratio and a band of signals input to the power amplifier PA are increased even at the same transmission power. In the LTE-A, although OFDMA is applied to the downlink, SC-FDMA is applied to the uplink to reduce the PAPR. However, in spite of the SC-FDMA scheme, the LTE-A specifications allow reduction of the maximum transmission power of a user equipment by using maximum power reduction (MPR) and additional MPR (A-MPR) at a specific condition to solve the spectrum emission problem caused by increase of the transmission power.

Also, among techniques currently discussed in the LTE-A standardization, the following techniques are likely to deteriorate the spectrum emission problem of the transmitting signals:

CA (Carrier Aggregation);
Simultaneous transmission of PUCCH (Physical Uplink Control Channel)/PUSCH (Physical Uplink Shared Channel); and
Clustered SC-FDMA.

The CA technique, as illustrated in FIG. 6, is to increase a transmission rate by using a plurality of carriers. However, if one power amplifier PA is used for each of antennas, increase of the PAPR, which is caused by increase of bandwidths, deteriorates the inter-modulation problem. The simultaneous transmission technique of PUCCH/PUSCH is to obtain efficiency of scheduling by allowing simultaneous transmission of the PUCCH corresponding to a control channel and the PUSCH corresponding to a data channel. However, the PAPR of the transmitting signals is greatly increased due to such simultaneous transmission. The clustered SC-FDMA technique is to allocate data to subcarriers non-contiguously, unlike the SC-FDMA applied to the LTE, which allocates data to subcarriers contiguously. Although the clustered SC-FDMA technique is to obtain increase a transmission rate within the network, it causes the spectrum emission problem caused by increase of the PAPR in the same manner as the simultaneous transmission technique of PUCCH/PUSCH.

Figure 7:
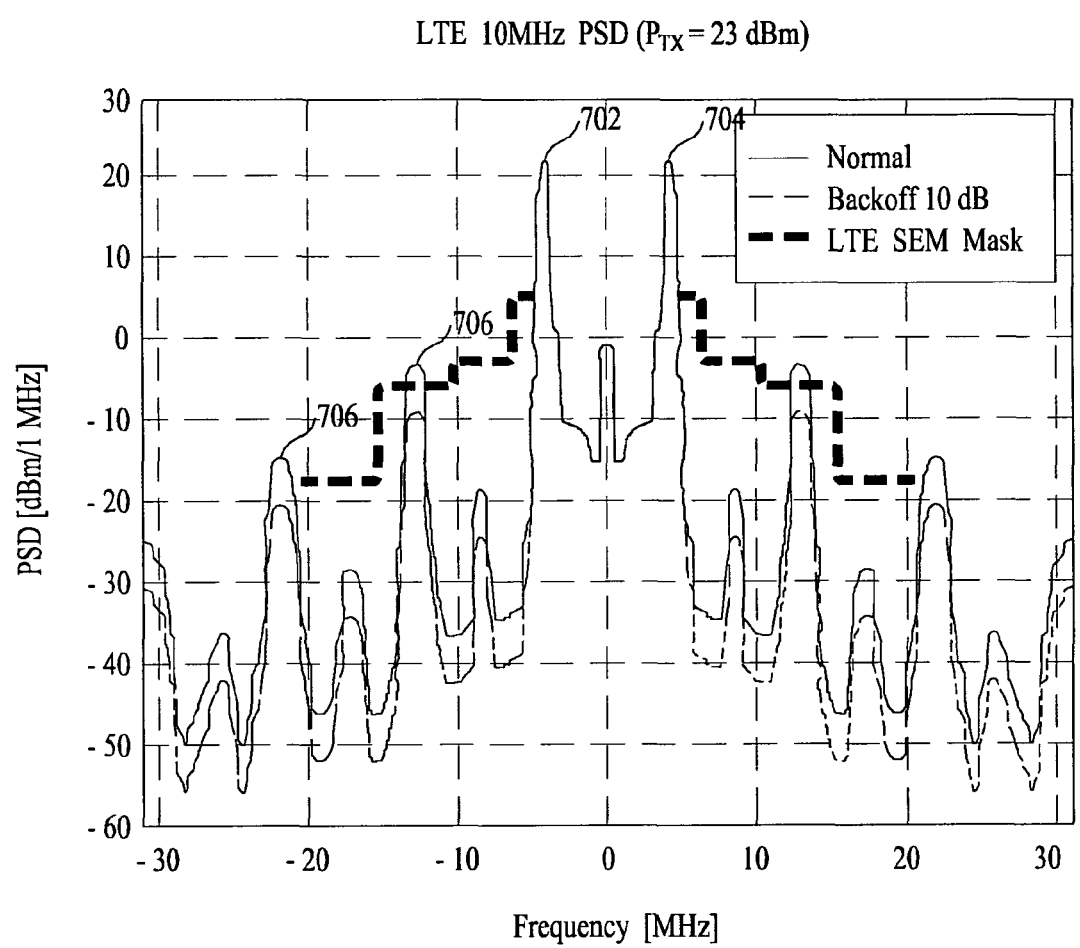
FIG. 7 is a diagram illustrating power spectrum density (PSD) in case of simultaneous transmission of a physical unlink shared channel (PUSCH) and a physical uplink control channel (PUCCH)

FIG. 7 is a diagram illustrating power spectrum density (PSD) in case of simultaneous transmission of a physical uplink shared channel (PUSCH) and a physical uplink control channel (PUCCH). In this case, it is assumed that a frequency bandwidth of the LTE system is 10 MHz and the maximum transmission power of the user equipment is 23 dBm.

Referring to FIG. 7, if the PUSCH 702 and the PUCCH 704 are transmitted through both ends of frequency bandwidths −5 MHz to 5 MHz (BW=10 MHz), inter-modulation component 706 is generated. In this case, an out-of-band signal due to inter-modulation may violate a spectrum emission mask (SEM) of the LTE. The SEM is a mask defined to limit the inter-modulation component which leaks out of the frequency bandwidths. In this case, the maximum transmission power of the user equipment can be reduced to reduce the inter-modulation component. For example, if the maximum transmission power is reduced by 10 dB (backoff 10 dB), the inter-modulation component is also reduced, thereby resulting in a satisfactory SEM. In FIG. 7, simultaneous transmission of PUSCH/PUCCH may correspond to simultaneous transmission of a plurality of clusters through SC-FDMA. Also, simultaneous transmission of PUSCH/PUCCH may correspond to non-contiguous CA.

The existing 3GPP LTE allows reduction of the maximum transmission power by using MPR/A-MPR to solve the spectrum emission problem under a specific condition. However, if various techniques for increasing bandwidth efficiency are used as described above, the PAPR is increased. Accordingly, in order to satisfy the spectrum emission condition suggested in the 3GPP specifications, in addition to PA backoff due to the existing MPR/A-MPR, additional PA backoff is required. However, since MPR/A-MPR based PA backoff and additional PA backoff reduce the maximum transmission power that can be used actually, service coverage and a transmission rate may be reduced. Also, a problem occurs in that PA efficiency is deteriorated by increase of PA backoff. As a result, problems occur in that power consumption is increased and the time used for the power is reduced.

In order to solve the aforementioned problems, the present invention suggests that one or more power amplifiers PAs are variably allocated and used depending on a communication status (for example, MIMO status) if a transmitting side (for example, user equipment) that supports MIMO performs signal transmission. In this case, PA backoff can additionally be obtained even without reduction of the maximum transmission power. In other words, signal quality can be improved even without reduction of the transmission power.

Figure 8:
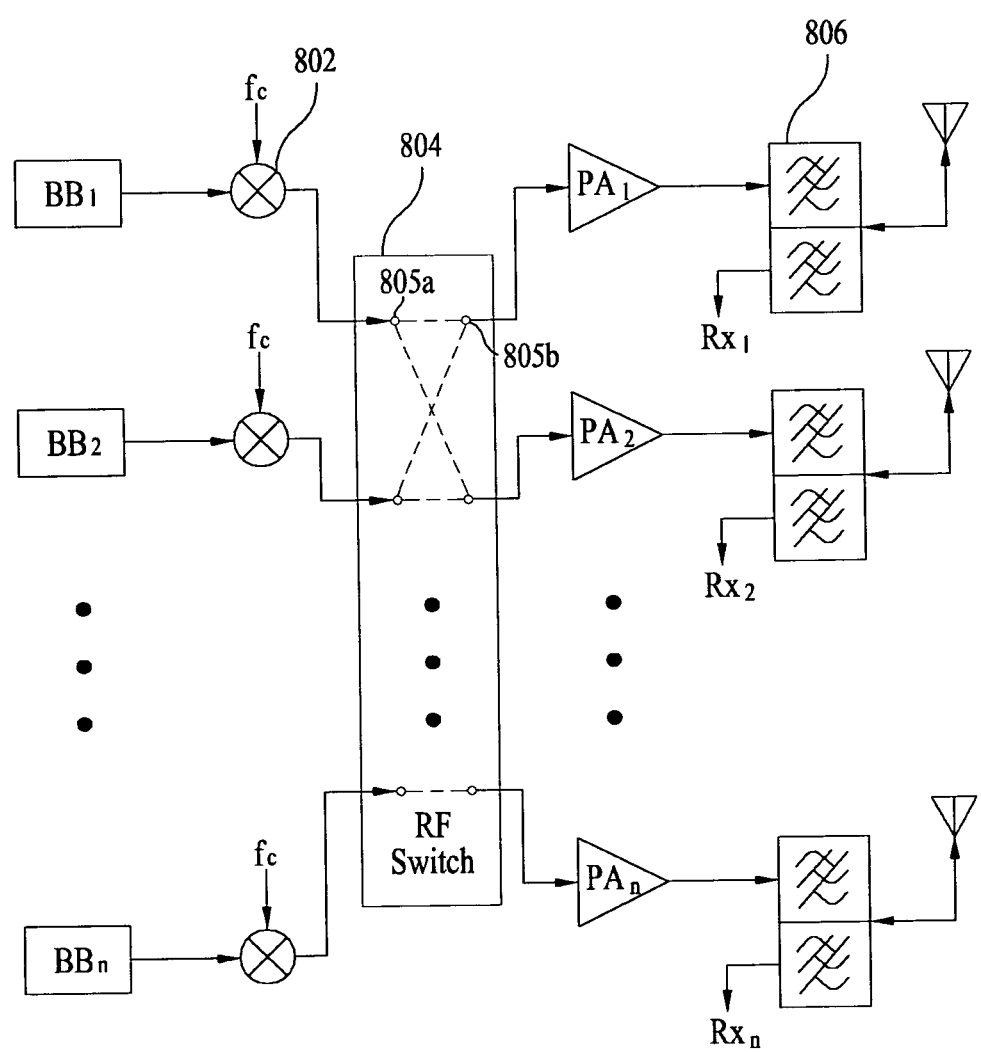
FIG. 8 is a diagram illustrating an architecture of an RF unit and a method for transmitting a signal using the RF unit according to one embodiment of the present invention.
Figure 9A:
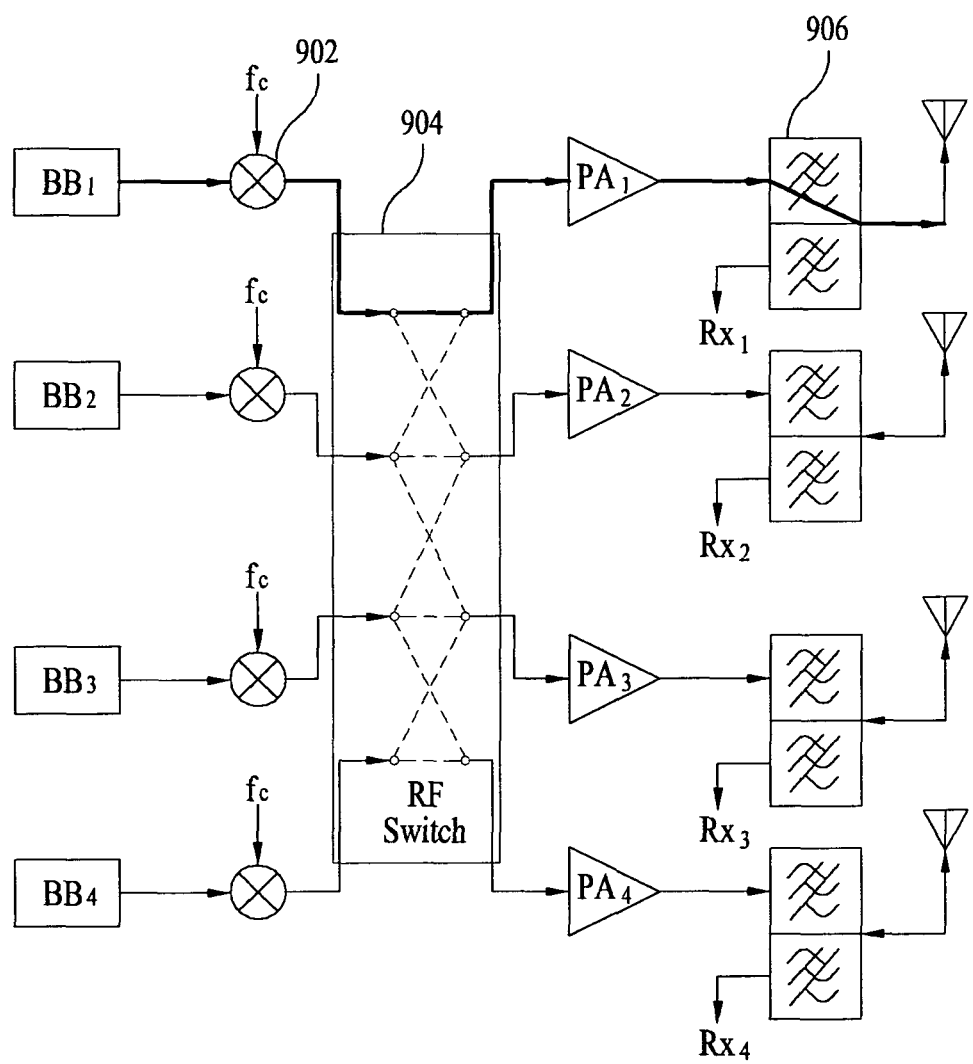
FIG. 9 is a diagram illustrating an architecture of an RF unit and a method for transmitting a signal using the RF unit when a rank is 1 in accordance with one embodiment of the present invention.
Figure 9B:
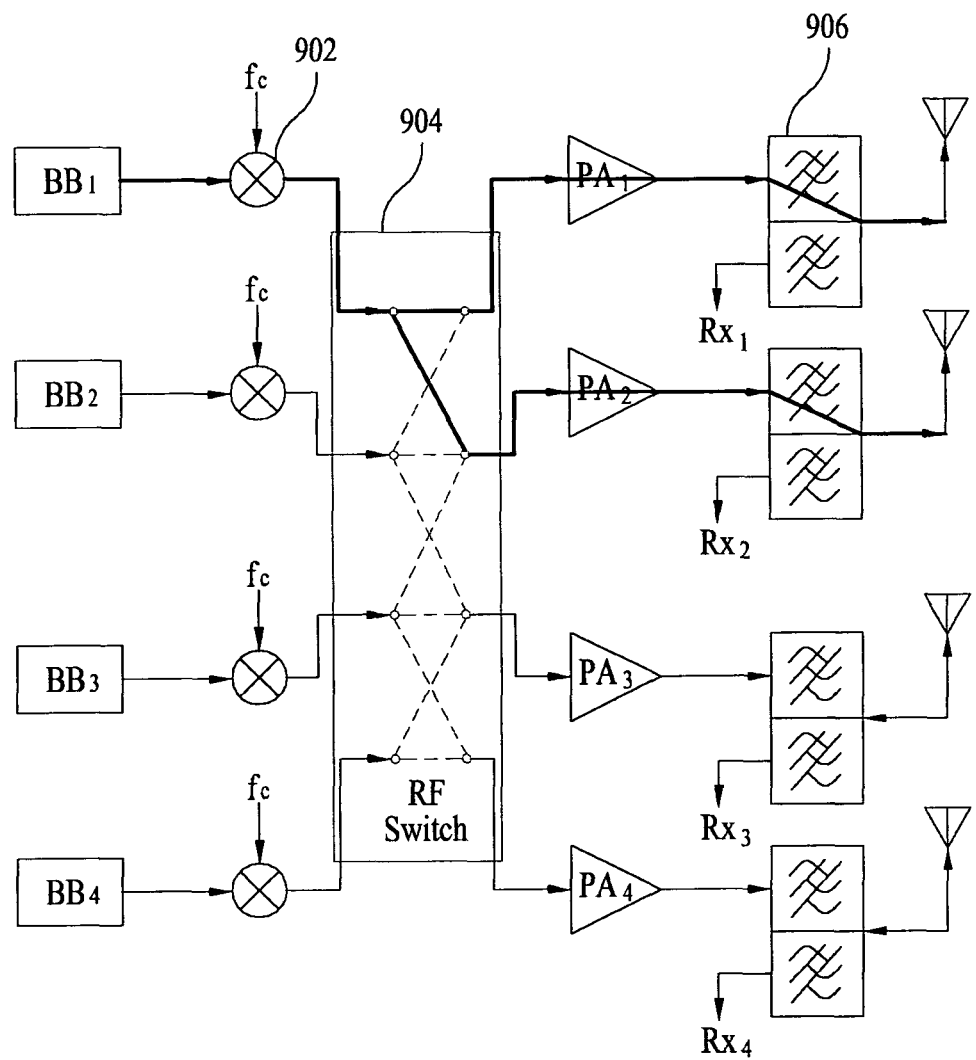
Figure 9C:
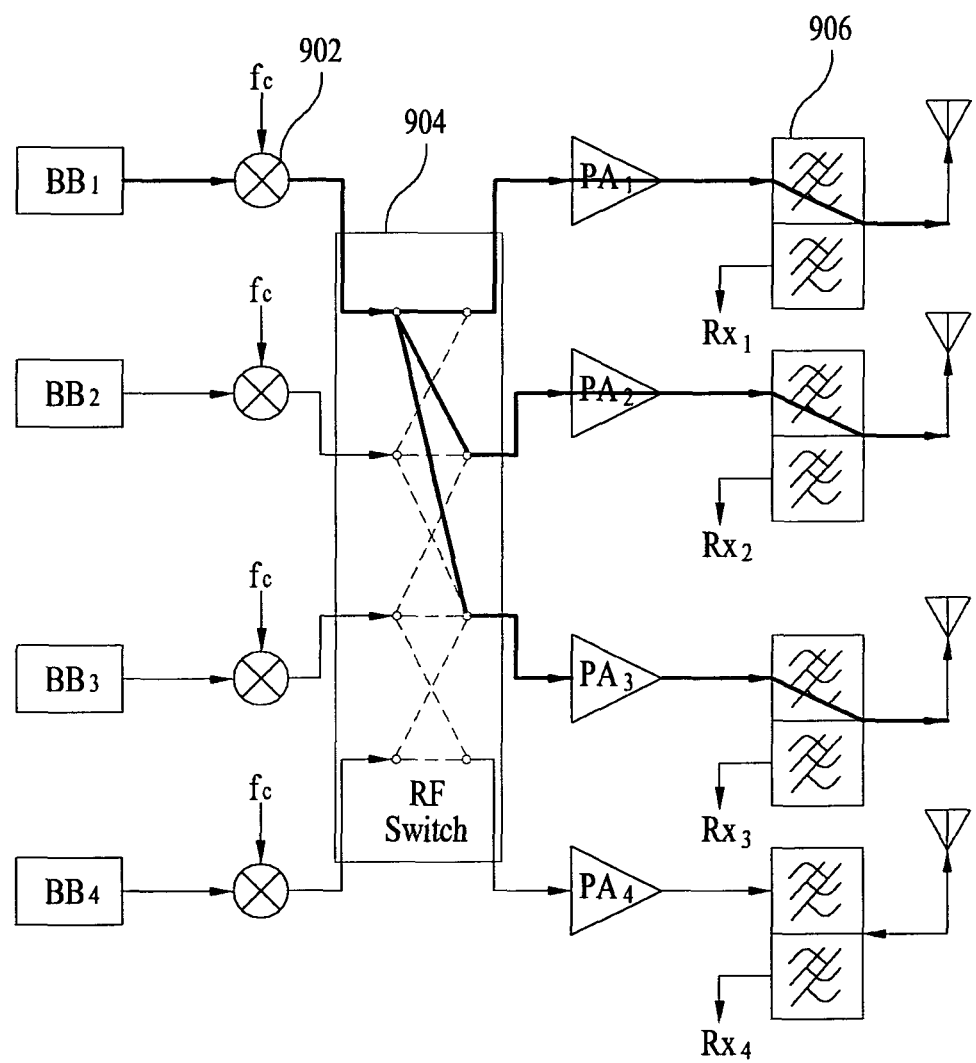
Figure 9D:
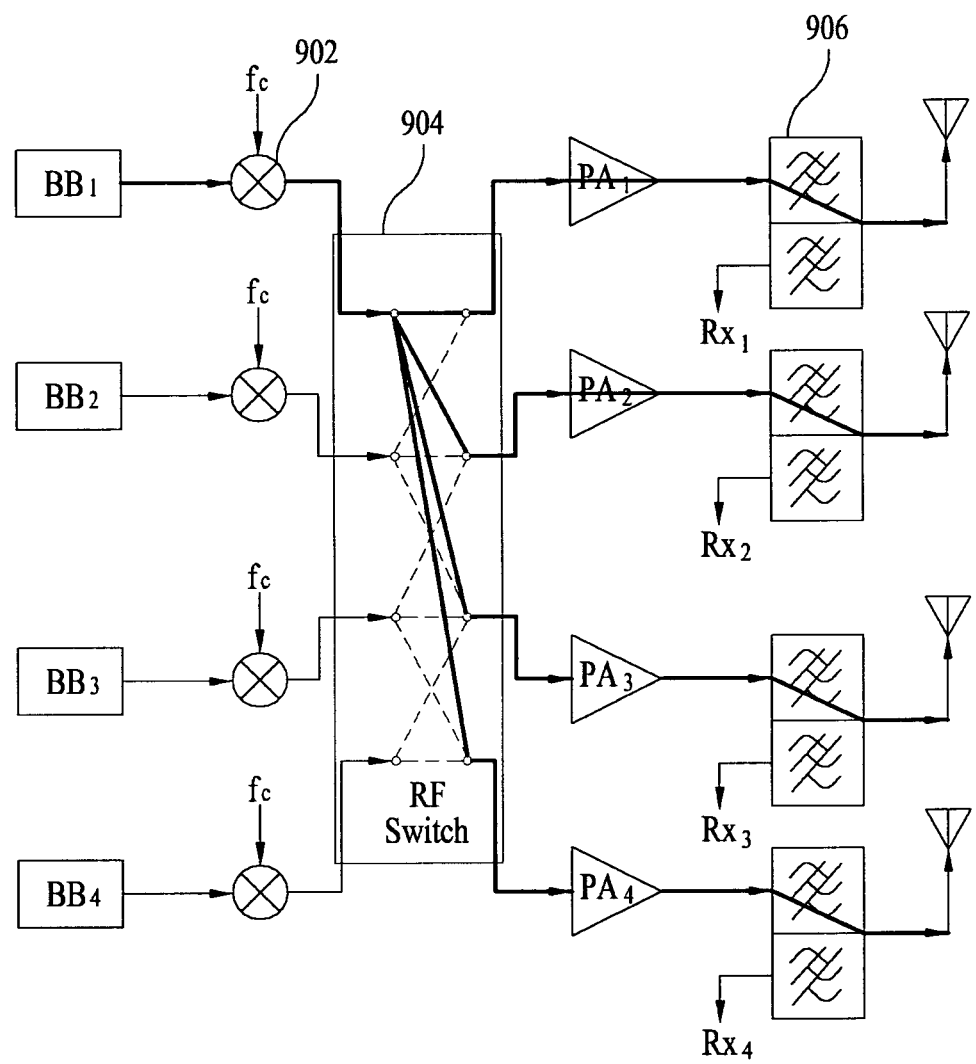

FIG. 8 is a diagram illustrating an architecture of an RF unit and a method for transmitting a signal using the RF unit according to one embodiment of the present invention.

Referring to FIG. 8, the RF unit includes a plurality of RF chains configured for each of antennas. Each of the RF chains includes a mixer 802, a power amplifier (PA), a duplexer (or filter) 806, and an antenna. The RF unit according to this embodiment further includes an RF switch 804. The RF switch 804 includes a plurality of input nodes 805a and a plurality of output nodes 805b, and mapping between the input nodes 805a and the output nodes 805b is dynamically controlled. RF chain switching can be performed dynamically considering the channel status. In other words, the RF switch 804 serves to map a transmitting signal (for example, base band signal) into the RF chain within the RF unit. A mapping pattern between the transmitting signal and the RF chain can be changed depending on time.

The RF switch 804 can increase a maximum output zone by additionally allocating the PA of a disabled RF chain to an enabled RF chain. For example, it is assumed that the maximum transmission power of the LTE-A user equipment is prescribed to 23 dBm and the LTE-A user equipment includes four antennas (i.e., four RF chains). In this case, if the LTE-A user equipment uses only one MIMO channel depending on the channel status, since only one RF chain is enabled in the RF architecture according to the related art illustrated in FIG. 5, the corresponding RF chain transmits a signal in accordance with the transmission power of 23 dBm. On the other hand, according to this embodiment, if three RF chains are enabled, since the maximum transmission power of the user equipment requires 23 dBm, each of the RF chains requires ¼ of the maximum transmission power. In other words, since the PA is only to satisfy the maximum transmission power of 17 dBm, PA backoff of 6 dB is obtained. Accordingly, the RF switch 804 serves to substantially increase PA backoff. However, power consumption may be increased by the additionally enabled PA. Accordingly, it may additionally be considered that the operation of the RF switch 804 is limited to a predetermined power level (for example, threshold value) or more of the transmitting signal. As the operation of the RF switch 804 is limited considering the power of the transmitting signal, increase of power consumption can be controlled.

Although FIG. 8 illustrates that the RF unit includes one RF switch, this is only exemplary, and the RF unit may include two or more RF switches. Although FIG. 8 illustrates that the RF switch 804 is located between the mixer 802 and the PA, this is only exemplary, and the RF switch 804 may be located before the PA without limitation. For example, the RF switch 804 may be located before the mixer 802. In this case, the input node 805a of the RF switch 804 is connected with a base band signal BB and the output node 805a of the RF switch 804 is connected with the mixer 802. However, if the RF switch 804 is located before the mixer 802, one base band signal BB can be mapped by a plurality of mixers 802. On the other hand, since only one mixer 802 is used for each of the base band signals in the architecture of FIG. 8, if the RF switch 804 is located before the mixer 802, resources for the mixer 802 may be wasted. The RF switch 804 can be configured by hardware or software without any specific limitation. If the RF switch 804 is configured by hardware, it can be configured using various switching elements. Examples of the switching element include MOSFET (Metal-Oxide semiconductor Field-Effect Transistor), JFET (Junction gate Field-Effect Transistor) and BJT (Bipolar Junction Transistor).

Figure 10A:
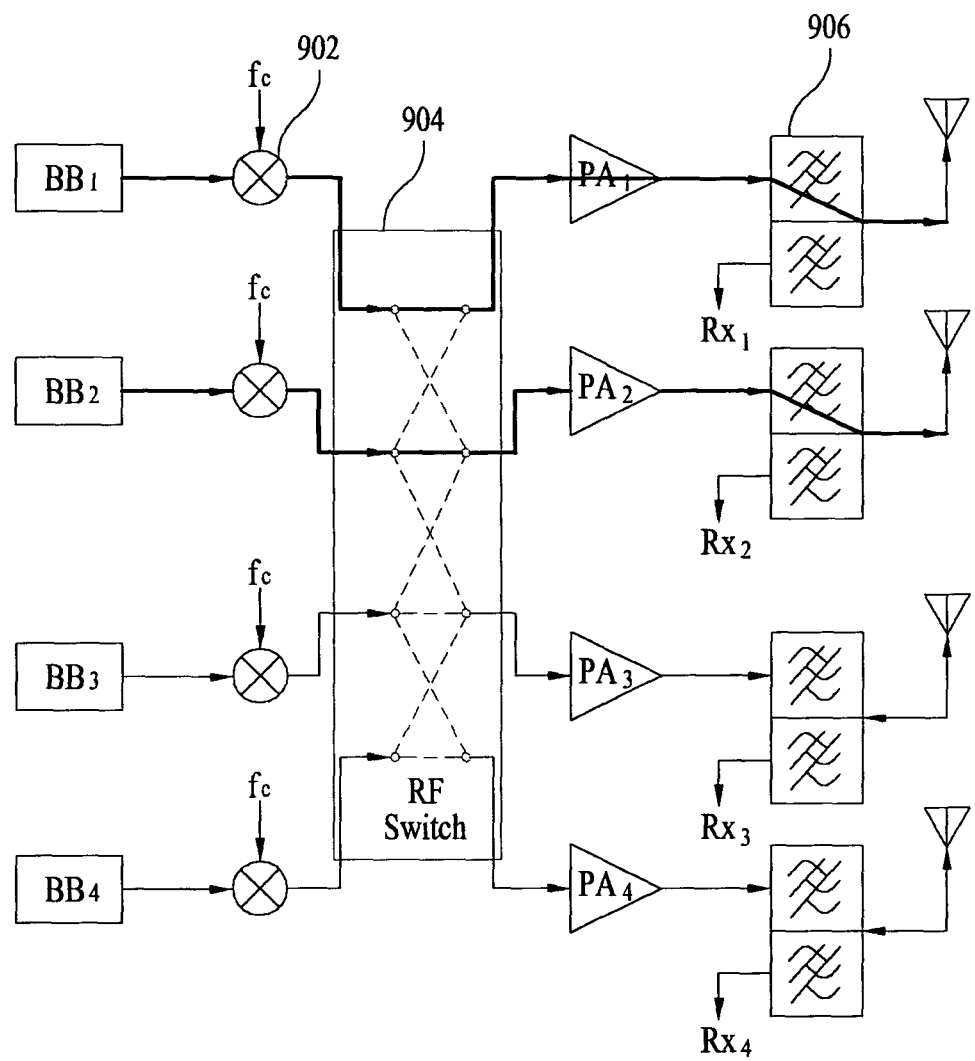
FIG. 10 is a diagram illustrating an architecture of an RF unit and a method for transmitting a signal using the RF unit when a rank is 2 in accordance with one embodiment of the present invention.
Figure 10B:
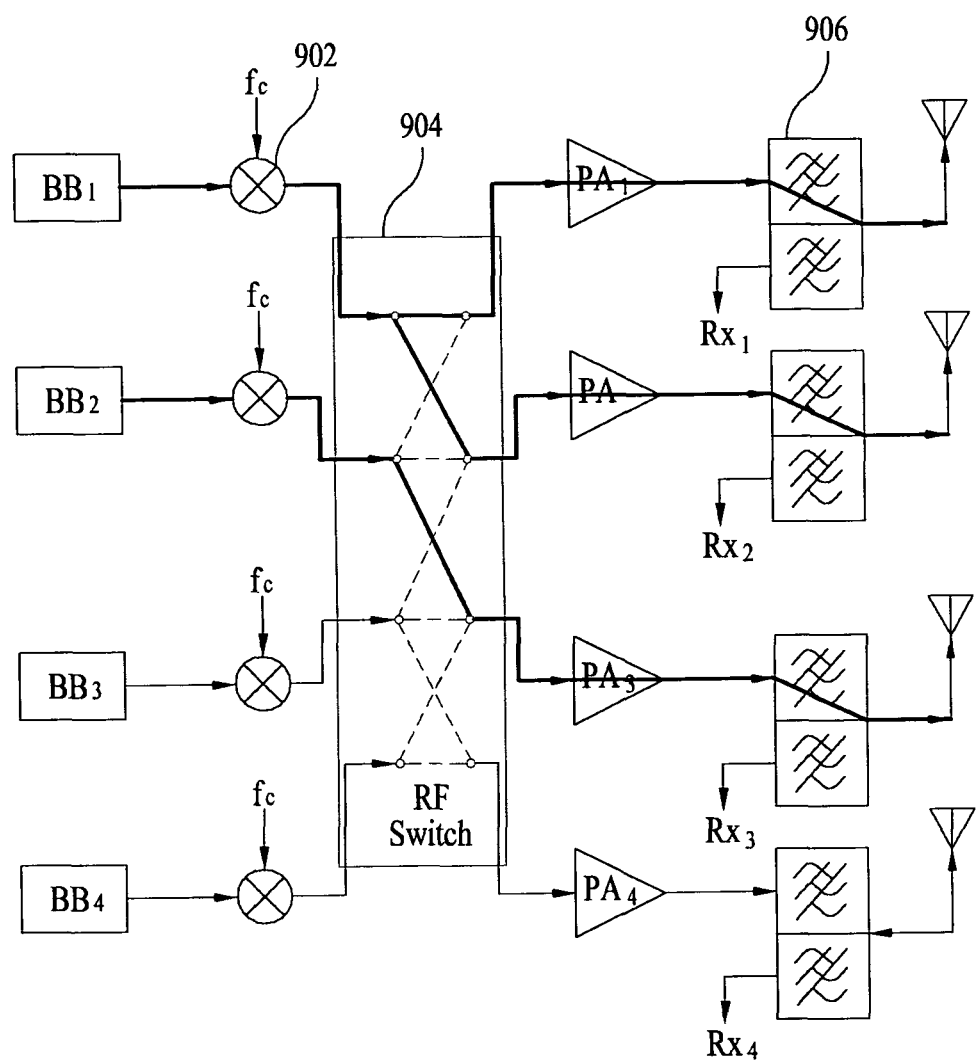
Figure 10C:
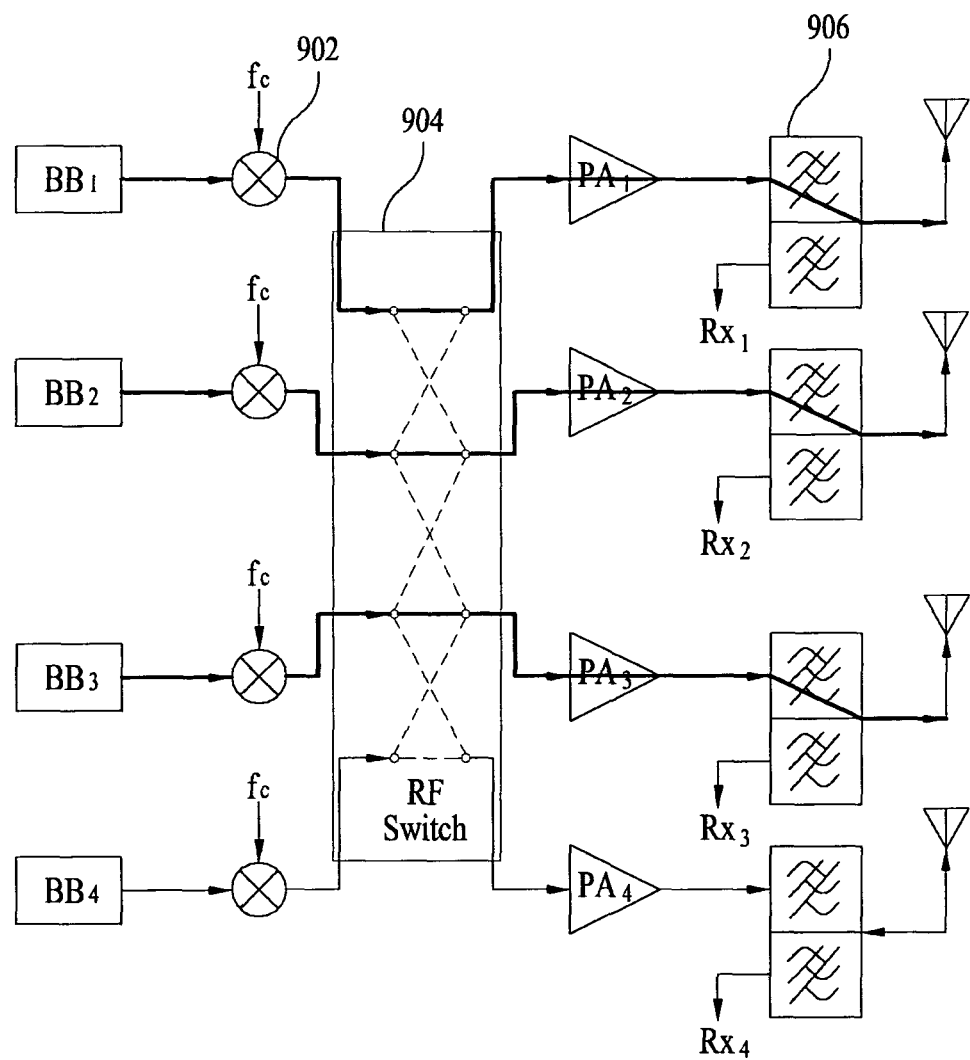
Figure 11A:
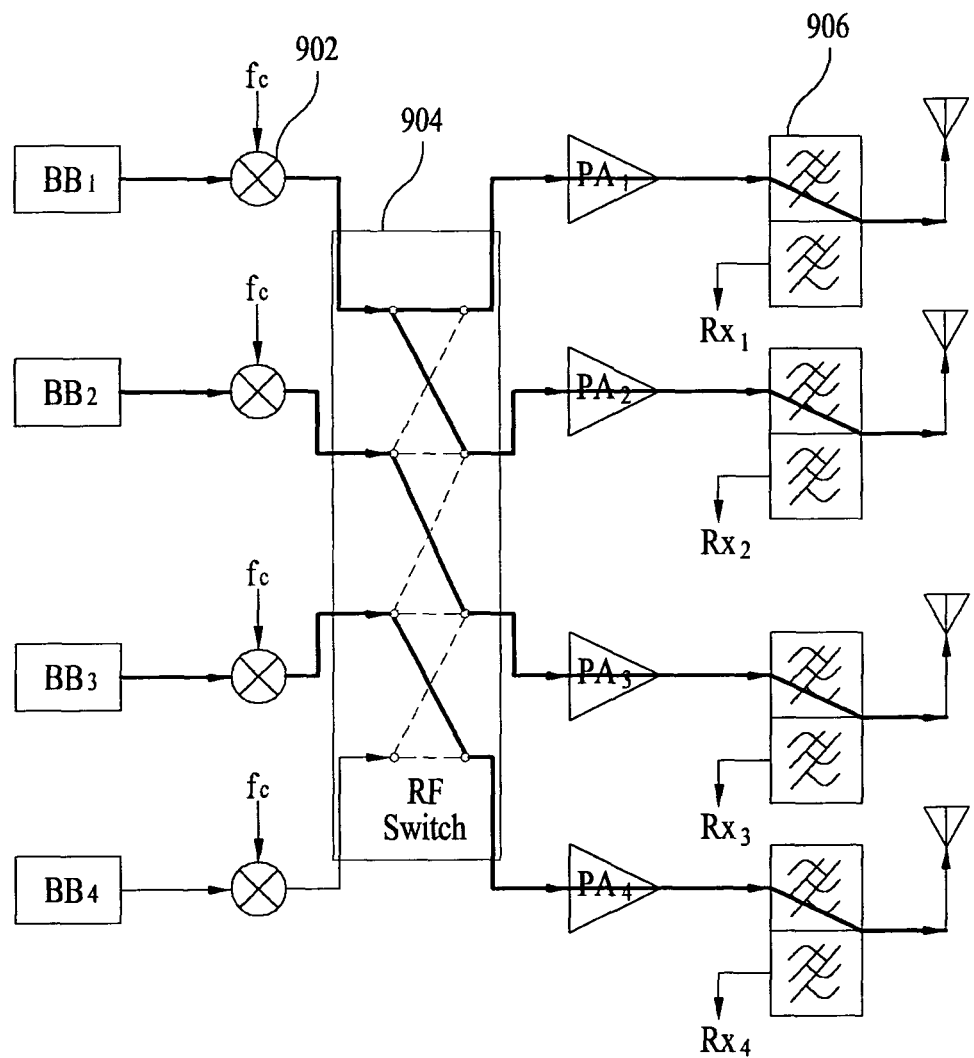
FIG. 11 is a diagram illustrating an architecture of an RF unit and a method for transmitting a signal using the RF unit when a rank is 3 in accordance with one embodiment of the present invention.
Figure 11B:
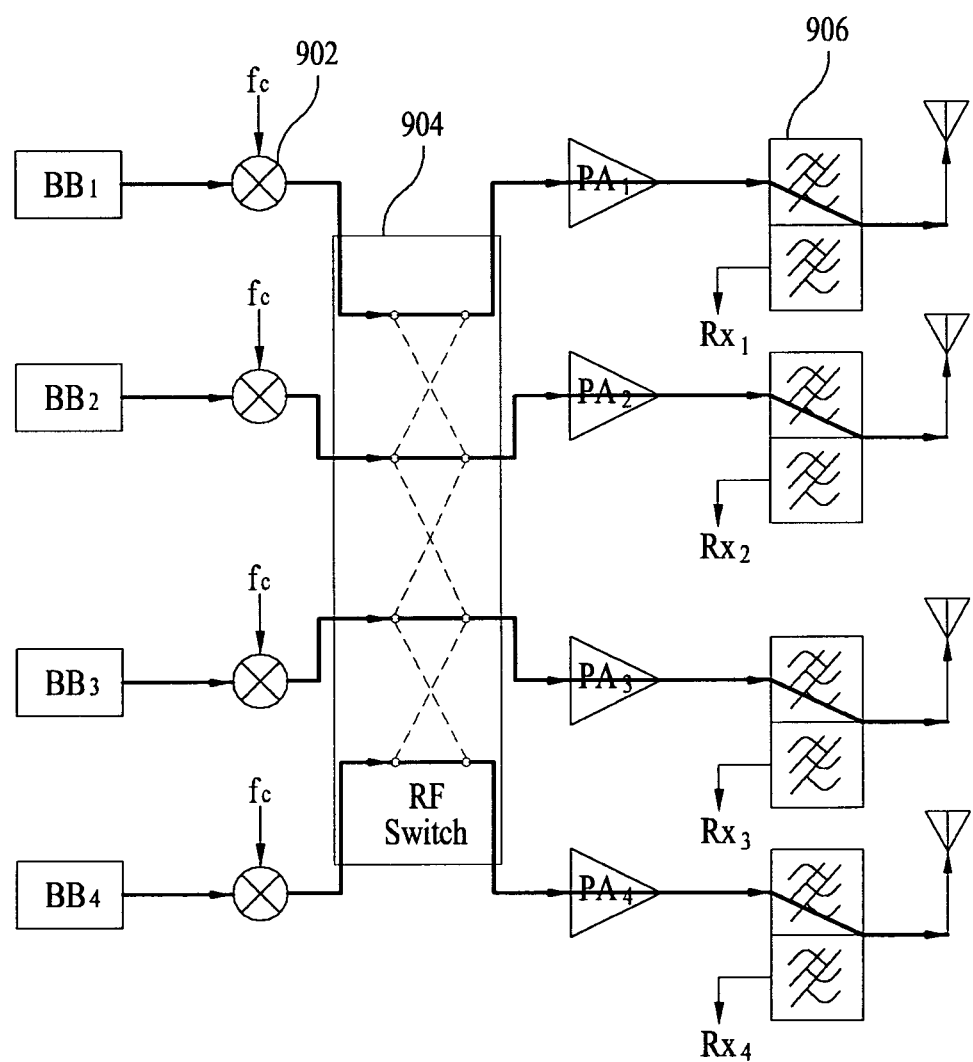

FIG. 9 to FIG. 11 are diagrams illustrating architectures of an RF unit and methods for transmitting a signal using the RF unit in accordance with one embodiment of the present invention. Referring to FIG. 9 to FIG. 11, the RF unit includes a plurality of RF chains and at least one RF switch 904 for each of antennas. Each of the RF chains includes a mixer 902, a PA, a duplexer (or filter) 906, and an antenna. For convenience, it is assumed that the number (i.e., rank) of maximum MIMO channels that can be supported is 4 in FIG. 9 to FIG. 11. However, it is to be understood that the number of maximum MIMO channels that can be supported is changed depending on antennas configured in a transmitter and a receiver.

FIG. 9 is a diagram illustrating an architecture of an RF unit and a method for transmitting a signal using the RF unit when a rank is 1 in accordance with one embodiment of the present invention. In this case, since one transmitting signal $BB_1$ is transmitted through an antenna, one PA $PA_1$ is basically allocated. At this time, the RF switch 904 can allocate the other three PAs $PA_2$~$PA_4$ of an idle mode to the enabled PA $PA_1$ in parallel in accordance with a power $P_{TX}$ of a transmitting signal. In more detail, if the power $P_{TX}$ is lower than $P_{TH\_11}$, the RF switch 904 allocates one PA $PA_1$ to one transmitting signal $BB_1$ only (FIG. 9a). If the power $P_{TX}$ corresponds to a period of $P_{TH\_11}$~$P_{TH\_12}$, the RF switch 904 allocates two PAs $PA_1$~$PA_2$ to one transmitting signal $BB_1$ (도 9b). In this case, PA backoff of 3 dB, approximately, is obtained. If the power $P_{TX}$ corresponds to a period of $P_{TH\_12}$~$P_{TH\_13}$, the RF switch 904 allocates three PAs $PA_1$~$PA_3$ to one transmitting signal $BB_1$ (FIG. 9c). In this case, PA backoff of 4.7 dB, approximately, is obtained. If the power $P_{TX}$ is higher than $P_{TH\_13}$, the RF switch 904 allocates all of four PAs $PA_1$~$PA_4$ to one transmitting signal $BB_1$ (FIG. 9d). In this case, PA backoff of 6 dB, approximately, is obtained (FIG. 9d). In this case, $P_{TH\_11}$, $P_{TH\_12}$ and $P_{TH\_13}$ are reference values (or threshold values) for PA allocation when a rank of MIMO is 1. Although this embodiment illustrates a plurality of reference values (or threshold values) and a plurality of PA allocation patterns, one reference value (or threshold value) and one PA allocation pattern may be defined for simplification of the system.

FIG. 10 is a diagram illustrating an architecture of an RF unit and a method for transmitting a signal using the RF unit when a rank is 2 in accordance with one embodiment of the present invention. In this case, since two transmitting signals $BB_1$~$BB_2$ are transmitted through each antenna, two PAs $PA_1$~$PA_2$ are basically allocated. At this time, the RF switch 904 can allocate the other two PAs $PA_3$~$PA_4$ of an idle mode to the enabled two PAs $PA_1$~$PA_2$ in parallel in accordance with a power $P_{TX}$ of a transmitting signal. In more detail, if the power $P_{TX}$ is lower than $P_{TH\_21}$, the RF switch 904 allocates two PAs $PA_1$~$PA_2$ to the two transmitting signals $BB_1$~$BB_2$, respectively (FIG. 10a). If the power $P_{TX}$ corresponds to a period of $P_{TH\_21}$~$P_{TH\_22}$, the RF switch 904 allocates two PAs $PA_1$~$PA_2$ to one transmitting signal $BB_1$ and allocates one PA $PA_3$ to the other one transmitting signal $BB_2$ (FIG. 10b). In this case, PA backoff of 3~4.7 dB, approximately, is obtained. If the power $P_{TX}$ is higher than $P_{TH\_22}$, the RF switch 904 allocates all of four PAs $PA_1$~$PA_4$ to the two transmitting signals $BB_1$~$BB_2$ (FIG. 10c). In this case, in accordance with additional PA backoff together with rank 2 of MIMO, PA backoff of total of 6 dB is obtained. In this case, $P_{TH\_21}$ and $P_{TH\_22}$ are reference values (or threshold values) for PA allocation when a rank of MIMO is 2. Although this embodiment illustrates a plurality of reference values (or threshold values) and a plurality of PA allocation patterns, one reference value (or threshold value) and one PA allocation pattern may be defined for simplification of the system.

FIG. 11 is a diagram illustrating an architecture of an RF unit and a method for transmitting a signal using the RF unit when a rank is 3 in accordance with one embodiment of the present invention. In this case, since three transmitting signals $BB_1$~$BB_3$ are transmitted through each antenna, three PAs $PA_1$~$PA_3$ are basically allocated. At this time, the RF switch 904 allocates the other one PA $PA_4$ of an idle mode to the enabled three PAs $PA_1$~$PA_3$ in parallel in accordance with a power $P_{TX}$ of a transmitting signal. In more detail, if the power $P_{TX}$ is lower than $P_{TH\_31}$, the RF switch 904 allocates only one PA $PA_1$~$PA_3$ to each of the transmitting signals $BB_1$~$BB_3$, respectively (FIG. 11a). If the power $P_{TX}$ is higher than $P_{TH\_31}$, the RF switch 904 allocates two PAs $PA_1$~$PA_2$ to one transmitting signal $BB_1$, and allocates two PAs $PA_3$~$PA_4$ to the other two transmitting signals $BB_2$~$BB_3$, respectively (FIG. 10b). In this case, PA backoff of 3~4.7 dB, approximately, is obtained. Also, $P_{TH\_31}$ is a reference value (or threshold value) for PA allocation when a rank of MIMO is 3.

Figure 12:
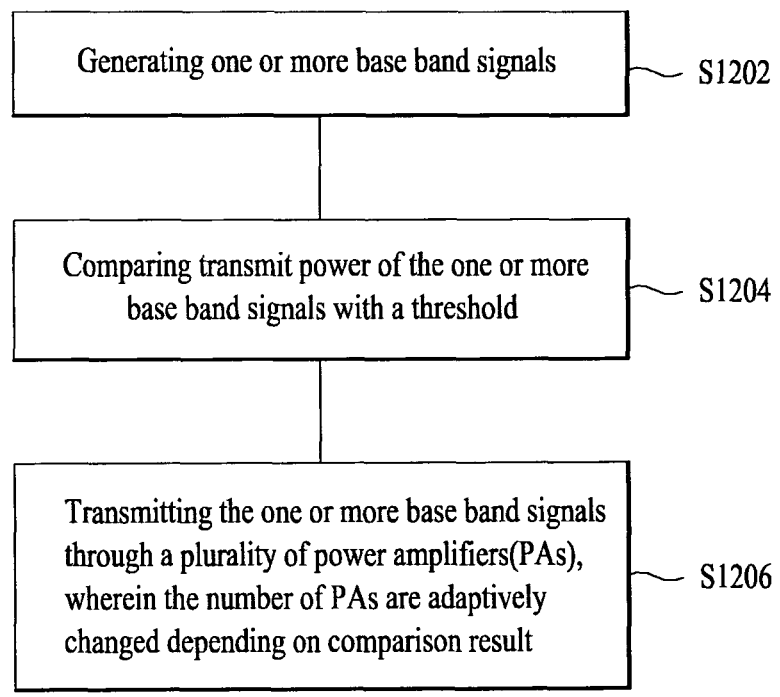
FIG. 12 is a flow chart illustrating signal transmission according to one embodiment of the present invention.

FIG. 12 is a flow chart illustrating signal transmission according to one embodiment of the present invention.

Referring to FIG. 12, a transmitter (for example, user equipment, base station, and relay) generates one or more base band signals (S1202). The base band signal can be generated through the signal processing illustrated in FIG. 4, for example. Then, the transmitter compares the transmission power of the one or more base band signals generated in step S1202 with a threshold value (S1204). The threshold value may be given for each rank, and one or more threshold values may be given for each of rank. Afterwards, the transmitter transmits the one or more base band signals through a plurality of RF chains (S1206). In this case, the RF chains used to transmit the base band signals, preferably the number of PAs can be changed adaptively depending on the compared result of the step S1204. The step S1206 can be implemented using the RF architectures illustrated in FIG. 9 to FIG. 11.

Power distribution of each PA according to the embodiment of the present invention can be performed for each of transmitting signals of MIMO channels or each of PAs. Table 1 illustrates an example of power distribution based on the transmitting signals of the MIMO channels, and Table 2 illustrates an example of power distribution based on the PA. In the Tables 1 and 2, it is assumed that the number of maximum MIMO channels that can be supported is 4 and the maximum output of the transmitter (for example, user equipment) is 23 dBm.

TABLE 1

| MIMO Rank | $P_{TH}$ | $P_{BB1}$ | PA | $P_{BB2}$ | PA | $P_{BB3}$ | PA | $P_{BB4}$ | PA | # of Active PA | BackOff MIMO | PA | Total |
|---|---|---|---|---|---|---|---|---|---|---|---|---|---|
| 1 | 16.98 | 0.00 | 1 | | | | | | | 1 | 0.00 | 0.00 | 6.02 |
|   | 19.99 | -3.01 | 2 | | | | | | | 2 | 0.00 | 3.01 | 6.02 |
|   | 21.75 | -4.77 | 3 | | | | | | | 3 | 0.00 | 4.77 | 6.02 |
|   | 23.00 | -6.02 | 4 | | | | | | | 4 | 0.00 | 6.02 | 6.02 |
| 2 | TBD   | -3.01 | 1 | -3.01 | 1 | | | | | 2 | 3.01 | 0.00 | TBD |
|   | TBD   | -6.02 | 2 | -3.01 | 1 | | | | | 3 | 3.01 | TBD  | TBD |
|   | 23.00 | -6.02 | 2 | -6.02 | 2 | | | | | 4 | 3.01 | TBD  | TBD |
| 3 | TBD   | -4.77 | 1 | -4.77 | 1 | -4.77 | 1 | | | 3 | 4.77 | 0.00 | TBD |
|   | 23.00 | -7.78 | 2 | -4.77 | 1 | -4.77 | 1 | | | 4 | 4.77 | TBD  | TBD |
| 4 | 23.00 | -6.02 | 1 | -6.02 | 1 | -6.02 | 1 | -6.02 | 1 | 4 | 6.02 | 0.00 | 6.02 |

TABLE 2

| MIMO Rank | $P_{TH}$ | $P_{BB1}$ | PA | $P_{BB2}$ | PA | $P_{BB3}$ | PA | $P_{BB4}$ | PA | # of Active PA | BackOff MIMO | PA | Total |
|---|---|---|---|---|---|---|---|---|---|---|---|---|---|
| 1 | 16.98 | 0.00 | 1 | | | | | | | 1 | 0.00 | 0.00 | 6.02 |
|   | 19.99 | -3.01 | 2 | | | | | | | 2 | 0.00 | 3.01 | 6.02 |
|   | 21.75 | -4.77 | 3 | | | | | | | 3 | 0.00 | 4.77 | 6.02 |
|   | 23.00 | -6.02 | 4 | | | | | | | 4 | 0.00 | 6.02 | 6.02 |
| 2 | 19.99 | -3.01 | 1 | -3.01 | 1 | | | | | 2 | 3.01 | 0.00 | 6.02 |
|   | 21.75 | -4.77 | 2 | -4.77 | 1 | | | | | 3 | 3.01 | 1.76 | 6.02 |
|   | 23.00 | -6.02 | 2 | -6.02 | 2 | | | | | 4 | 3.01 | 3.01 | 6.02 |
| 3 | 21.75 | -4.77 | 1 | -4.77 | 1 | -4.77 | 1 | | | 3 | 4.77 | 0.00 | 6.02 |
|   | 23.00 | -6.02 | 2 | -6.02 | 1 | -6.02 | 1 | | | 4 | 4.77 | 1.25 | 6.02 |
| 4 | 23.00 | -6.02 | 1 | -6.02 | 1 | -6.02 | 1 | -6.02 | 1 | 4 | 6.02 | 0.00 | 6.02 |

In the above Tables 1 and 2, $BB_n$ means a n-th base band processor (or signal). $P_{th}$ means maximum available transmission power (dB unit)(threshold value) in corresponding configuration. $P_{BBn}$ represents a relative power distribution value of each transmitting signal of the MIMO channels (dB unit). As illustrated in Table 1, if power distribution is performed uniformly for each of the transmitting signals of the MIMO channels, PA backoff may unequally be allocated to each of the transmitting signals. As a result, maximum PA backoff that can be obtained is more reduced than that obtained by the power equally distributed to each of the PAs. However, the maximum PA backoff conforms to the basic rule of MIMO. Also, if the power is equally distributed to each of the PAs as illustrated in Table 2, unevenness of the transmission power to reach maximum 3 dB for each of the transmitting signals may occur in the MIMO channels. However, maximum effective PA backoff can be obtained in accordance with the present invention. Generally, since gain unevenness of 6 dB or more may occur between the antennas, unevenness of the power for each of the transmitting signals may be disregarded in power distribution equivalent to each of the PAs. Gain for power distribution to each of the PAs may be set anywhere before the PA including the base band processor.

According to the embodiment of the present invention, since the PA of the transmitting side can obtain additional backoff, distortion of the transmitting signals, which is caused by inter-modulation, can be reduced. Also, since additional MPR is not required for the transmitting side, the transmission rate can be increased and the service zone can be reduced. In the mean time, the PA of the transmitting side is dynamically allocated depending on the transmission power, power consumption is not increased. Also, according to the embodiment of the present invention, capacity of the PA used except for power backoff may be reduced. In this case, power consumption of the transmitting side can be reduced, and as great output can be made even by small capacity of the PA, the required cost can be reduced. The aforementioned embodiment of the present invention can be applied to all transmitting devices, which support MIMO, as well as the LTE-A.

Figure 13:
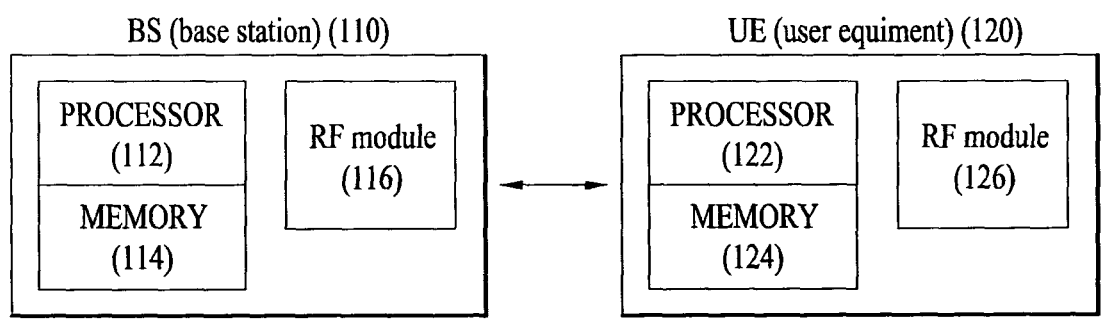
FIG. 13 is a diagram illustrating a user equipment and a base station, which can be applied to the embodiment of the present invention.

FIG. 13 is a diagram illustrating a base station and a user equipment, which can be applied to the embodiment of the present invention.

Referring to FIG. 13, the wireless communication system includes a base station (BS) 110 and a user equipment (UE) 120. In the downlink, the transmitter is a part of the base station 110, and the receiver is a part of the user equipment 120. In the uplink, the transmitter is a part of the user equipment 120, and the receiver is a part of the base station 110. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The RF unit 116 of the base station 110 and the RF unit 126 of the user equipment 120 can perform the architectures and methods illustrated in FIG. 8 to FIG. 12.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention relates to a transmitter having multiple antennas, and can be applied to an RF architecture of a transmitter and a method for the same.

What is claimed is:

1. A transmitter used for wireless communication, the transmitter comprising:
a plurality of transmitting antennas;
a plurality of radio frequency (RF) chains configured for each of the transmitting antennas, wherein each of the RF chains includes a mixer for frequency conversion and a power amplifier (PA) connected with a mixer;
a signal generator generating one or more transmitting signals at a base band; and
an RF switch mapping the one or more transmitting signals into the plurality of RF chains,
wherein the RF switch is located between the mixer and the PA, or
wherein the RF switch is located between the mixer and the signal generator connected with the mixer.

2. The transmitter of claim 1, wherein the RF switch maps at least a part of the one or more transmitting signals into the plurality of RF chains in a one-to-multi mapping mode.

3. The transmitter of claim 1, wherein the RF switch changes the number of RF chains mapped into the one or more transmitting signals, based on a transmission power used for the one or more transmitting signals.

4. The transmitter of claim 1, wherein the RF switch performs mapping between the one or more transmitting signals and the plurality of RF chains independently for each of the transmitting signals.

5. The transmitter of claim 1, wherein the RF switch changes a mapping pattern between the one or more transmitting signals and the plurality of RF chains depending on time.

6. A method of transmitting signals at a transmitter in a wireless communication system that supports multiple input multiple output (MIMO), the method comprising the steps of:
generating one or more base band signals;
converting the one or more base band signals into one or more band pass signals through a plurality of RF chains configured for each of transmitting antennas; and
transmitting the one or more band pass signals to a receiver,
wherein the step of converting the one or more base band signals includes:
mapping the one or more base band signals into the plurality of RF chains;
frequency-uplink-converting the one or more base band signals; and
amplifying a power of the frequency-uplink-converted signal,
wherein the step of mapping the one or more base band signals is performed between the frequency-uplink-converting step and the amplifying step, or
wherein the step of mapping the one or more base band signals is performed between the generating step and the frequency-uplink-converting step.

7. The method of claim 6, wherein at least a part of the one or more transmitting signals is mapped into the plurality of RF chains in a one-to-multi mapping mode.

8. The method of claim 6, wherein the number of RF chains mapped into the one or more transmitting signals is changed based on a transmission power used for the one or more transmitting signals.

9. The method of claim 6, wherein mapping between the one or more base band signals and the plurality of RF chains is performed independently for each of the base band signals.

10. The method of claim 6, wherein a mapping pattern between the one or more base band signals and the plurality of RF chains is changed depending on time.

* * * * *